J. S. HAMILTON.
PORTABLE ELECTRIC LAMP DRY BATTERY.
APPLICATION FILED FEB. 5, 1915.

1,202,996.

Patented Oct. 31, 1916.

Witnesses.
Albert G Barnes.

INVENTOR.
James Shanks Hamilton
By
Attorney.

500 # UNITED STATES PATENT OFFICE.

JAMES SHANKS HAMILTON, OF LONDON, ENGLAND.

PORTABLE ELECTRIC-LAMP DRY BATTERY.

1,202,996.   Specification of Letters Patent.   Patented Oct. 31, 1916.

Application filed February 5, 1915. Serial No. 6,363.

*To all whom it may concern:*

Be it known that I, JAMES SHANKS HAMILTON, a subject of His Majesty the King of England, residing at London, England, have invented certain new and useful Improvements in Portable Electric-Lamp Dry Batteries, of which the following is a specification.

This invention relates to portable electric lamp dry batteries of the kind which are formed of a plurality of dry cells and a containing case of paper combined together as a unit each battery unit having exposed contact pieces.

The invention deals with an improved mode of completing such a battery unit for sale so that while it may be tested for condition it cannot be normally used, or accidentally short circuited without breaking a seal, and so that until the unit is opened for use the several elements thereof are held under and maintained in substantially relative motionless restraint, and also protected from shock by the cushioning provision which arises from the special mode of preparing the unit in the factory.

According to the present improvement the top of the wall of the cell containing case part of the battery unit is prolonged or left clear to form a rim within which a separate perforated cover plate is adapted to fit and to be sealed therein to complete such case as a fully inclosing envelop for the cell or cells and its or their contact pieces the latter being folded down onto the top of the battery, and a separating strip of waxed paper or other non-conductive medium being interposed in cases where the terminal strips will then overlap and would otherwise short circuit the battery.

In order that the improvement according to the invention may be clearly understood reference is directed to the accompanying drawings in which:—

Figure 1:
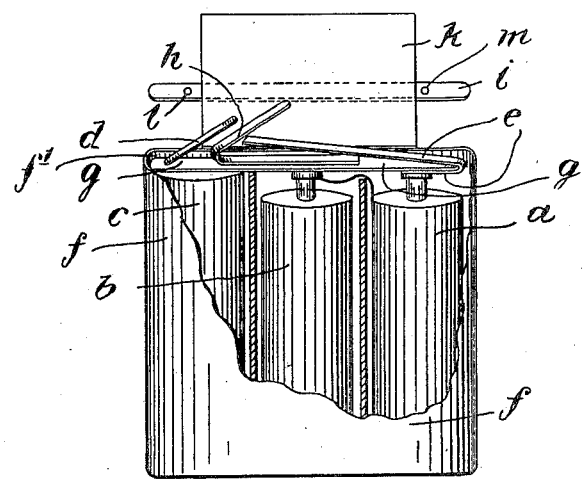
Figure 2:
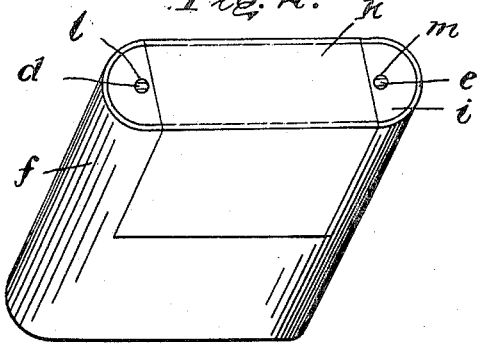

Figure 1 is an elevation of a battery of dry cells inclosed in the containing case provided therefor, the case being shown partly broken away, while, Fig. 2 is an outside perspective view of the containing case.

Referring to Fig. 1, $a$, $b$ and $c$ designate a triad of dry cells constituting a three cell battery for use with a pocket lamp of known type. As illustrated and in accordance with the invention forming the subject matter of my concurrent application for patent Serial No. 6362, filed February 5, 1915, the cell $c$ is inverted relatively to the cells $a$ and $b$, and the long contact piece $e$ is secured at one end thereof to the positive pole, or carbon element while the short contact piece $d$ is secured at one end thereof to the negative pole or zinc element.

With the inversion of the cell $c$ according to the invention forming the subject matter of my concurrent application aforesaid there may be substituted for the closure or top filling of pitch or wax now generally used a non-conductive strip $g$ of millboard, paper, fiber, wood, vulcanite, mica, celluloid or other like material, the material when of a moisture absorbing nature being preferably impregnated with paraffin wax; slow baking to eliminate moisture being followed by immersion while dry and hot in the melted wax.

Under the invention to prevent short circuiting of the battery in cases where the contact pieces $d$ and $e$ overlap when these are folded down onto the top of the battery for the purpose previously referred to a separating strip $h$ of waxed paper or other non-conductive medium is interposed.

Completion of the containing case part of a battery unit of the kind described, or of the usual kind as a fully inclosing and perforate case or envelop for the cells and their contact pieces is by virtue of the top of the wall of the containing case $f$ being prolonged or left clear as indicated at $f^1$ to form a rim within which a separate perforated cover plate $i$ is adapted to fit and complete such case as a fully inclosing envelop for the cells and their folded terminals. The cover plate $i$ is then sealed in position, a suitable seal for convenient use being a paper strip seal such as $k$ and this as shown is placed over the cover plate $i$ and secured to the opposite sides of the shell or case $f$; thus a sealed unit for sale is formed which can be arranged to be tested without breakage of the seal or removal of the cover plate $i$; thus access may be had in known manner to the two contact pieces $d$ and $e$ through openings $l$ and $m$ in the cover plate $i$ so that an outside or testing circuit can be closed by passing the terminals thereof through the openings in the cover plate and contacting with the contact pieces $d$ and $e$ of the battery.

Having thus described my invention, what I desire to secure by Letters Patent is:—

A portable electric lamp dry battery, comprising a plurality of cells, an open-end casing surrounding said cells and extending beyond the cell-tops to form a rim, a strip of non-conductive material lying on the cell-tops, flexible circuit closing contacts, leading from the appropriate cells, lying folded within the said rim, a separate removable perforated cover plate of non-conductive material fitting within said rim against a springing back tension of said folded contacts, and means opposing such tension for securing said perforated cover plate in said position under seal.

In testimony whereof, I affix my signature in presence of two witnesses.

JAMES SHANKS HAMILTON.

Witnesses:
 ALEX HAMILTON,
 A. G. BARNES.